United States Patent [19]

Schwarz

BEST AVAILABLE COPY

[11] E Re. 29,082

[45] Reissued Dec. 14, 1976

[54] INTRUSION DETECTOR

[75] Inventor: Frank Schwarz, Stamford, Conn.

[73] Assignee: Barnes Engineering Company, Stamford, Conn.

[22] Filed: Sept. 12, 1975

[21] Appl. No.: 612,883

Related U.S. Patent Documents

Reissue of:

[64] Patent No.: 3,760,399
Issued: Sept. 18, 1973
Appl. No.: 209,660
Filed: Dec. 20, 1971

[52] U.S. Cl. ..... 340/258 D; 250/338; 250/342; 340/228 R

[51] Int. Cl.[2] ..... G08B 13/18

[58] Field of Search ..... 340/258 B, 258 D, 228 R, 340/228 S; 250/338, 342

[56] References Cited

UNITED STATES PATENTS

| | | | |
|---|---|---|---|
| 3,036,219 | 5/1962 | Thompson | 340/258 B |
| 3,056,106 | 9/1962 | Hendricks | 340/258 D |
| 3,267,727 | 8/1966 | Benzinger | 250/338 X |
| 3,354,309 | 11/1967 | Volkovisky | 250/338 X |
| 3,444,544 | 5/1969 | Pearson et al. | 340/258 B |
| 3,476,938 | 11/1969 | Jankowitz et al. | 250/338 X |
| 3,524,180 | 8/1970 | Cruse | 340/258 B |
| 3,631,434 | 12/1971 | Schwartz | 340/258 D |
| 3,727,057 | 4/1973 | Higby et al. | 250/338 |

*Primary Examiner*—David L. Trafton
*Attorney, Agent, or Firm*—Joseph Levinson; Robert Ames Norton

[57] ABSTRACT

A simple optical system collects and applies radiation from a predetermined field of view onto a thermopile detector. The thermopile detector has a plurality of rows of thermocouples having all active junctions with alternate polarity which are aligned in columns of the same polarity, whereby in response to an object moving across the thermopile an output signal is produced of alternately changing polarity. Logic circuitry is provided for processing the signals from the thermopile in a predetermined polarity sequence to discriminate against false alarms and for indicating the presence of an intruder and sounding an alarm.

6 Claims, 7 Drawing Figures

Fig. 4.
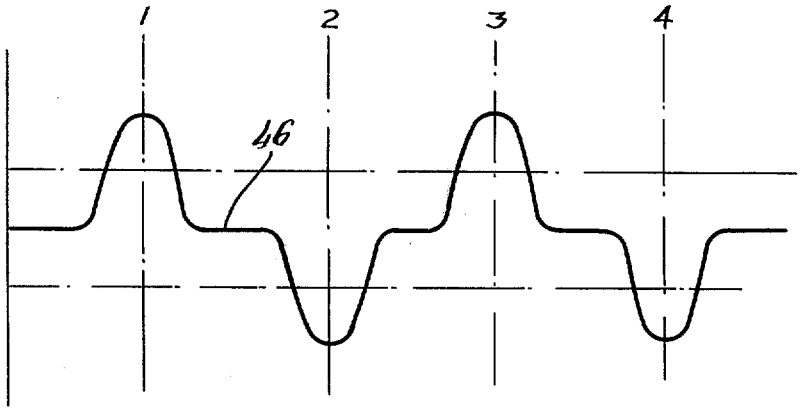
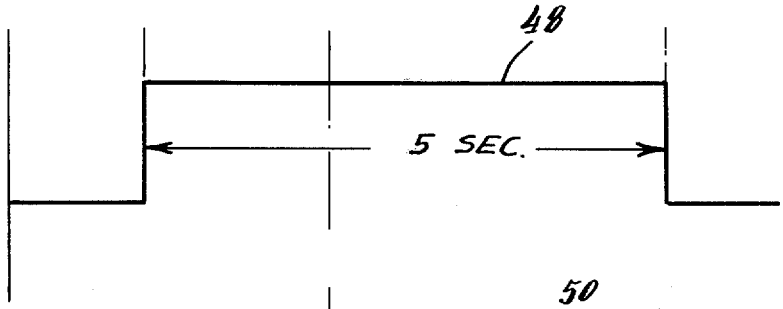
Fig. 5.
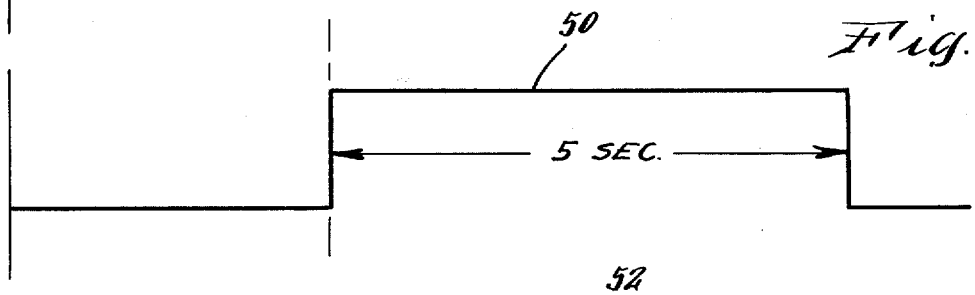
Fig. 6.
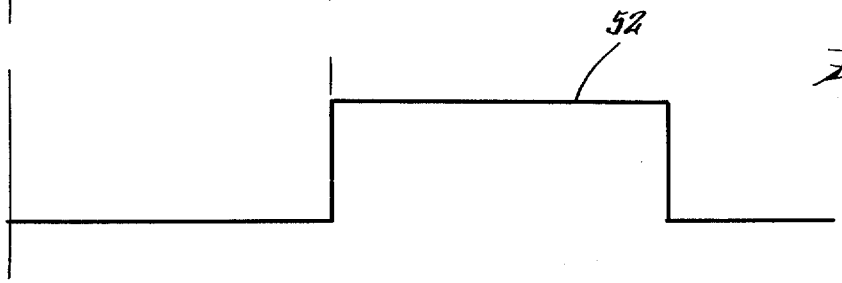
Fig. 7.

INTRUSION DETECTOR

Matter enclosed in heavy brackets [ ] appears in the original patent but forms no part of this reissue specification; matter printed in italics indicates the additions made by reissue.

BACKGROUND OF THE INVENTION

This invention relates to an intrusion detector, and more particularly to a motion detection system utilizing a simple wide field of view optical system with a thermopile detector which is so constructed as to produce opposite polarity output signals as an object in the field of view of the optical system moves across the thermopile to produce a sequence of motion which with proper processing and logic circuitry indicates the presence of an intruder.

Many intrusion detector systems have been proposed, both active and passive in nature. The active systems generally require a source of radiant energy in the form of light or other radiation which is projected into or covers a predetermined area which, when crossed by the intruder, interrupts or alters the radiation to cause an alarm. Since all active systems require a source of radiation or a transmitter, additional equipment is needed and is a source of failure as well as being more easily detected by the intruder. The passive type system utilizes the radiation in the form of infrared which is generated by the intruder and picked up by a suitable infrared detector and processed to give an alarm. Noise spikes and other forms of interference in many of these systems generate unwanted alarms. Various passive systems have been suggested which provide a plurality of detector elements viewing separate or overlapping fields of view in an attempt to overcome these problems. The present invention is a passive system which has a simple optical system covering a wide field of view which utilizes a single thermopile detector device directed to the solution of these problems.

SUMMARY OF THE INVENTION

It is an object of the present invention to provide an intrusion detector utilizing a new detection approach for indicating the presence of an intruder in the field of view of the system.

Another object of this invention is to provide a new and improved intrusion detector having a simple wide-angle field of view and a single thermopile detector for indicating the presence of motion within the field of view of the detector.

Still a further object of this invention is to provide a new and improved intrusion detector which decreases the probability of false alarms.

In carrying out this invention in one illustrative embodiment thereof, a simple wide field-of-view optical collecting system directs radiation from its field of view onto a thermopile detector having an all-active junction construction. The thermopile detector is made up of rows of a plurality of thermocouples with alternate polarity which are aligned in columns having the same polarity. Circuit means are coupled to the thermopile detector for processing signals therefrom in a predetermined polarity sequence such that an object moving across the field of view of the thermopile produces a changing polarity output signal which indicates the presence of an intruder in the field of view of the thermopile and discriminates against false alarms.

BRIEF DESCRIPTION OF THE DRAWINGS

FIGS. 4–7 represent waveforms which will be useful in illustrating the operation of one form of electronic processing and circuit logic which may be employed in the present invention.

DESCRIPTION OF THE PREFERRED EMBODIMENTS

Figure 1:
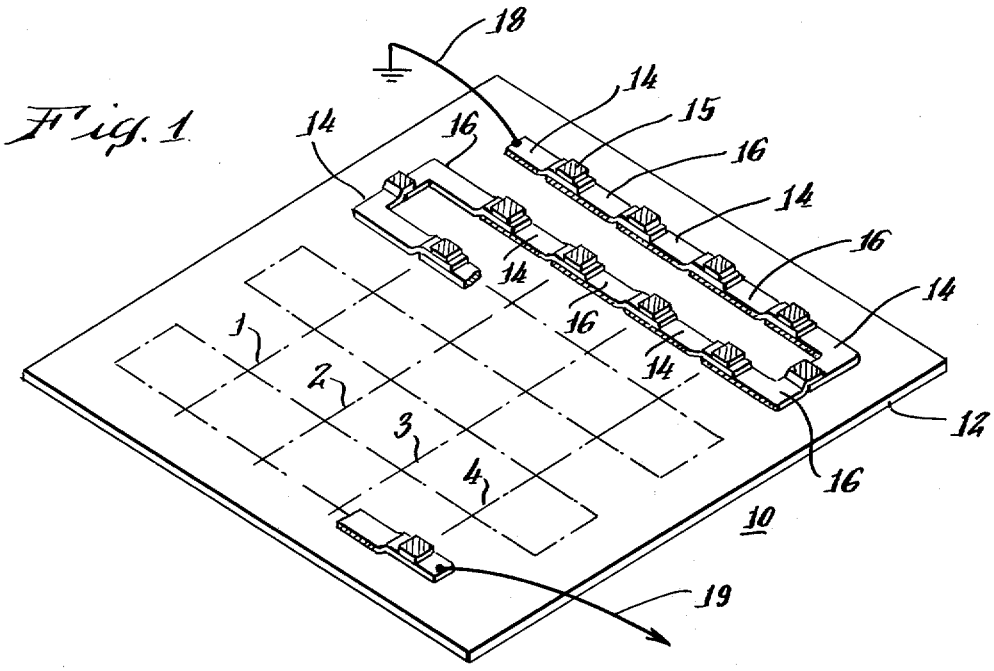
FIG. 1 is an isometric view of one form of novel thermopile structure, broken for ease of illustration, which may be employed in the present invention.

Referring now to FIG. 1, an unusual thermopile detector 10 is shown which is a key element in the present invention. The thermopile 10 is formed of a series of thermocouples of dissimilar metals 14 and 16, forming a junction 15 which is blackened to enhance the thermocouple response. It should be appreciated that the drawing of the thermopile is considerably out of scale for ease of illustration. The metals 14 and 16 are very thin and are considerably narrowed between junctions. The dissimilar metals 14 and 16 may be bismuth and antimony, or any other suitable thermocouple material. The thermopile 10 is formed using conventional vacuum evaporation techniques on a substrate 12 of material which is a fairly good insulator, for example, polystyrene, plexiglass, polyethylene terephthalate, etc. The illustrated construction of thermopile 10 differs from conventional thermopile construction in that all junctions are active, with no reference junctions. With such a construction, alternating polarities are set up across a row of thermocouples. The thermopile 10 is also arranged such that columns 1, 2, 3 and 4 are formed, with the thermocouples making up the columns being of the same polarity. All of the thermocouple junctions 15 are serially connected between a pair of output leads 18 and 19, such that the signals are additive and therefore an object appearing across one column provides an additive signal output of greater amplitude than could be achieved by a single thermocouple. With the construction shown, an object moving across columns 1, 2, 3 and 4 will generate a sinusoidal output across the output leads 18 and 19, which signal can be processed to detect the presence of an intruder. A thermopile operating in the conventional mode would generate a DC signal, which would require a reticle or moving chopper to provide the AC signal generated in the present invention without any additional moving elements. The thermopile 10 is also quite useful as the intrusion detector, since it operates in the far infrared region of the electromagnetic spectrum with a long wavelength filter placed before the detector, and therefore would be immune to flashing lights, automobile headlights, or other types of signals which would produce false alarms in other active or passive types of alarm systems.

Figure 2:
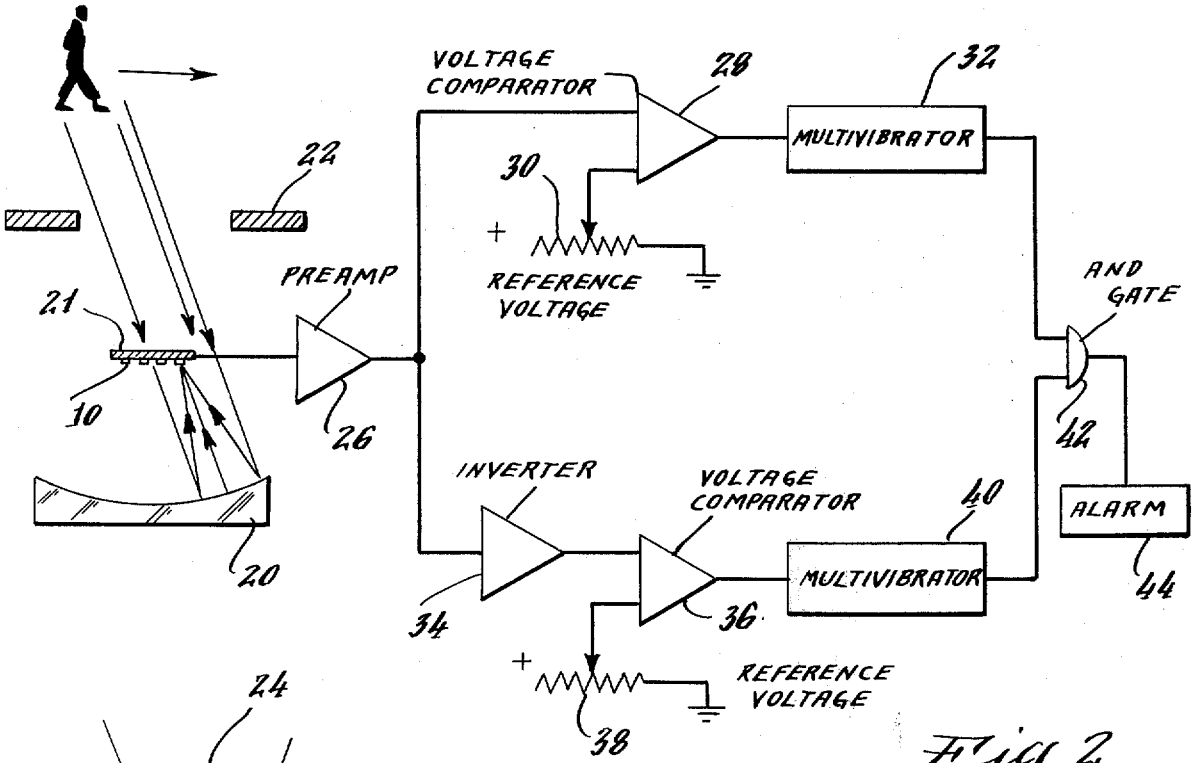
FIG. 2 is an optical and electrical schematic of an illustrative embodiment of the intrusion detector of this invention.

FIG. 2 illustrates one type of spherical reflecting concentric optical system which provides a wide field of view, on the order of 90° × 60°, with sufficient sensitivity for ranges of about 30 feet, which could be utilized to guard an entire room. The optical system is essentially a spherical reflecting mirror 20 which applies radiation collected from a field of view through aperture stops 22 onto the thermopile 10 which is mounted on a concentric spherical support 21. Instead of mounting the thermopile 10 on a curved support 21, concentric with the spherical reflector 20, a flat mounting base may be utilized as in FIG. 3, utilizing a wide-field-of-view lens 24, or with the spherical reflector 20, as illustrated in FIG. 2 by utilizing an oval window. The essential feature of the optical system is that it be as simple as possible and yet perform the function of covering a wide fiew of view and applying radiation therefrom onto the thermopile detector.

Figure 3:
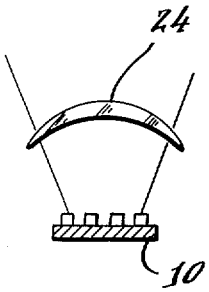
FIG. 3 is an optical schematic of another form of optical system which may be employed in the present invention.

Signals from the thermopile 10 are applied to a preamplifier 26. At this point it should be remembered that the thermopile detector 10 is designed so that a person moving horizontally across the sensor's field of view, and thus crossing columns 1, 2, 3 and 4 successively, causes a succession of thermocouples to be heated up and in consequence generate output signals. With such an occurrence, the output from the preamplifier 26 is shown in FIG. 3 as waveform 46 with alternately positive- and negative-going signals being generated as the object moves across the various columns formed by the thermocouples of the thermopile 10. The preamplifier 26 is coupled to a voltage comparator 28 having a reference voltage 30 applied thereto, and voltage comparator 28 is connected to a monostable multivibrator 32. The preamplifier 26 boosts the signals represented by waveform 46 in FIG. 4 to a sufficient level so that the voltage comparator 28 switches state when the signal 46 exceeds the reference voltage 30. This activates multivibrator 32, which sets up an output voltage of fixed value represented by the waveform 48 in FIG. 5, which is held for a fixed period, for example 5 seconds. The preamplifier 26 is also connected to another channel which includes an inverter 34, another voltage comparator 36 having a reference voltage level 38, and a multivibrator 40. Accordingly, if the signal 46 is due to an intruder in the field of view, the person would have moved so as to heat up column 2 of the thermopile detector 10. This generates a negative-going signal that will be sensed by the voltage comparator 36 after having the signal polarity changed by inverter stage 34. If the threshold level set by the reference voltage level 38 is exceeded, the voltage comparator 36 changes state and activates monostable multivibrator 40 to generate a fixed amplitude pulse for a given duration, for example 5 seconds, as shown by the waveform 50 on FIG. 6. Multivibrators 32 and 40 are both connected to an AND gate 42, which is connected to an alarm 44. When the output pulses of multivibrators 32 and 40 coincide, the AND gate 42 is enabled, generating a signal 52 as shown in FIG. 7, and the alarm 44 is activated. The alarm 44 may take any suitable form, visual, audible, or can be used to actuate other devices, such as telephone lines, etc. If the single monostable multivibrator 32 has been triggered on by a false signal, such as a noise spike or RF interference, etc., only one output pulse will have been initiated. Lacking confirmation from a second, opposite polarity pulse, there would be no output signal from the AND gate, and no alarm, so that false alarms would be avoided. Although only two logic channels have been illustrated in the electronic processing, for simplicity in explanation and ease of illustration, the same logic could be extended to a sequence of three or more alternating polarity pulses that may be made mandatory before a final output alarm is generated. Imposition for a requirement for additional output pulses enormously decreases the probability of false alarms that may be generated by the intrusion system.

The intrusion alarm system of the present invention, being passive and small, is not readily detectable, and may easily be concealed if it is desired to have it operate surreptitiously. Since the optical system is simple and covers a wide field of view, an entire room may be covered to detect intrusion, no matter where the intruder enters the covered area. Since the detector is all active junctions, producing a varying polarity signal as an intruder traverses the field of view of the detector, no moving parts are necessary to detect the intrusion, making the system simple, with long operating life. The optics and detector portion of the system may be mounted conveniently in the desired location which has an unobstructed view of the entire area to be covered, while the electronics may be positioned elsewhere, inside or outside the protected area. The sinusoidal voltage pattern generated by the thermopile detector of the present invention, which is produced by the motion of an intruder, provides an ideal output for logic circuitry for sensing two opposite polarity pulses and thus being able to recognize the signal pattern of interest to generate an alarm only on that pattern, and thus prevent false alarms.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

I claim:

1. An intrusion detector for generating alternating signals as a result of thermally varying patterns of objects moving across the field of view of the detector comprising a. a layer of thermal insulating material, b. a thermopile detector mounted on said layer of insulating material comprised of a plurality of thermocouples of dissimilar metals with all junctions being constantly exposed to the field of view of said detector, c. said thermocouples being serially connected in rows with adjacent thermocouples in said rows being of alternate polarity d. said rows of thermocouples being serially interconnected and aligned to form columns of the same polarity thermocouples and adjacent columns of alternate polarity thermocouples, and e. output terminals connected across said thermopile detector which provides thereat a changing polarity output signal in respect to an object moving across said thermopile detector.

2. The structure set forth in claim 1 having optical means for collecting and applying radiation from a predetermined field of view on all junctions of said thermopile detector.

3. The structure set forth in claim 2 wherein said optical means comprises a wide angle lens.

4. The structure set forth in claim 2 wherein said optical means includes a wide angle spherical reflector.

5. The structure set forth in claim 1 including a. optical means for collecting and applying radiation from a predetermined field of view on all junctions of said thermopile detector, and b. circuit means coupled to the output terminals of said thermopile detector for processing signals from said thermopile detector in a predetermined polarity sequence for indicating the presence of an intruder and discriminating against false alarms.

6. The structure set forth in claim 5 wherein said circuit means includes a plurality of signal processing channels which respond to said predetermined polarity sequence and generate signals of fixed duration, the coincidence of which provides an output indicating the presence of an intruder.

* * * * *